US009160966B2

(12) United States Patent
Zhang et al.

(10) Patent No.: US 9,160,966 B2
(45) Date of Patent: Oct. 13, 2015

(54) IMAGING THROUGH A DISPLAY SCREEN

(75) Inventors: Cha Zhang, Sammamish, WA (US);
Timothy A. Large, Bellevue, WA (US);
Zhengyou Zhang, Bellevue, WA (US);
Ruigang Yang, Lexington, KY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 621 days.

(21) Appl. No.: 13/104,984

(22) Filed: May 11, 2011

(65) Prior Publication Data
US 2012/0287223 A1    Nov. 15, 2012

(51) Int. Cl.
*H04N 7/14*    (2006.01)

(52) U.S. Cl.
CPC ..................... *H04N 7/144* (2013.01)

(58) Field of Classification Search
USPC ............ 348/14.08, 14.09, 14.16, 61; 379/156
See application file for complete search history.

(56) References Cited

U.S. PATENT DOCUMENTS

| 3,844,645 | A  | * | 10/1974 | Forster, Jr. ...................... 353/10 |
| 7,042,486 | B2 | * | 5/2006 | Manico et al. .................. 348/61 |
| 8,488,042 | B2 |   | 7/2013 | Robinson |
| 2005/0267826 | A1 | * | 12/2005 | Levy et al. ....................... 705/34 |
| 2008/0018555 | A1 |   | 1/2008 | Kuo et al. |
| 2008/0043100 | A1 | * | 2/2008 | Sobel et al. .................... 348/139 |
| 2008/0298571 | A1 | * | 12/2008 | Kurtz et al. .................... 379/156 |
| 2009/0167966 | A1 |   | 7/2009 | Nam et al. |
| 2009/0278913 | A1 | * | 11/2009 | Rosenfeld et al. ......... 348/14.16 |
| 2010/0287511 | A1 |   | 11/2010 | Meier et al. |
| 2011/0102538 | A1 | * | 5/2011 | Tan ............................. 348/14.08 |
| 2011/0149012 | A1 | * | 6/2011 | Bolle et al. ................. 348/14.08 |
| 2011/0157345 | A1 | * | 6/2011 | Manico et al. .................. 348/61 |

OTHER PUBLICATIONS

Lu, et al., "Study on an Augmented Reality Based 3-Dimensional See-through Wall", Retrieved at<<http://ieeexplore.ieee.org/stamp/stamp.jsp?tp=&arnumber=5647749>>, 3rd International Congress on Image and Signal Processing (CISP2010), Oct. 2010, pp. 1680-1683.
Yuan, Chang, "Creating Virtual 3D See-Through Experiences on Large-size 2D Displays",Retrieved at<<http://ieeexplore.ieee.org/stamp/stamp.jsp?tp=&arnumber=4811033>>, Mar. 14-18, 2009, pp. 237-238.
"Screen Excellence Introduces Enlightor™ 4K, the World's First Acoustically Transparent Screen Fabric for 4K D-Cinema and Home Theater Enthusiasts", Retrieved at<<http://www.projectorcentral.com/news_story_1242.htm>>, Retrieved Date: Jan. 19, 2011, pp. 2.
Williams, Martyn., "Samsung develops see-through screens to replace windows",Retrieved at<<http://www.macworld.com/article/155630/2010/11/samsung_windows.html>>, Nov. 13, 2010, pp. 3.
Oppenheimer, J., "Prompting Apparatus",Retrieved at<<http://www.freepatentsonline.com/2883902.pdf>>, Apr. 28, 1959, pp. 10.

(Continued)

*Primary Examiner* — Joseph J Nguyen
(74) *Attorney, Agent, or Firm* — Sandy Swain; Judy Yee; Micky Minhas

(57) ABSTRACT

The described implementations relate to enhancement images, such as in videoconferencing scenarios. One system includes a poriferous display screen having generally opposing front and back surfaces. This system also includes a camera positioned proximate to the back surface to capture an image through the poriferous display screen.

14 Claims, 6 Drawing Sheets

(56) References Cited

OTHER PUBLICATIONS

Ishii, et al., "Clearboard: A Seamless Medium for Shared Drawing and Conversation with Eye Contact", Retrieved at<<http://projects.ischool.washington.edu/mcdonald/courses/info447_au02/wk5/Ishii.Clearboard.CHI92.pdf>>,May 3-7, 1992, pp. 525-706.

Gross, et al., "Blue-C: A Spatially Immersive Display and 3D Video Portal for Telepresence",Retrieved at<<http://www.koller-meier.ch/esther/grossSIGGRAPH03.pdf>>,2003, pp. 9.

Wilson, Andrew D., "Touchlight: An Imaging Touch Screen and Display for Gesture-Based Interaction", Retrieved at<< http://research.microsoft.com/en-us/um/people/awilson/publications/wilsonicmi2004/icmi%202004%20touchlight.pdf>>,Oct. 13-15, 2004, pp. 8.

Kuechler, et al., "Holoport—A Device for Simultaneous Video and Data Conferencing Featuring Gaze Awareness", Retrieved at <<http://ieeexplore.ieee.org/stamp/stamp.jsp?arnumber=01667630>>, Mar. 25-29, 2006, pp. 7.

Tan, et al., "Connect Board: A Remote Collaboration System that Supports Gaze-Aware Interaction and Sharing", Retrieved at << http://ieeexplore.ieee.org/stamp/stamp.jsp?tp=&arnumber=5293268>>, Oct. 5-7, 2009, pp. 6.

"SMX Cinema Solutions", Retrieved at <<http://www.smxscreen.com/>>, Retrieved date : Jan. 19, 2011, pp. 5.

Aydin, et al., "An Occlusion Insensitive Adaptive Focus Measurement Method", Retrieved at <<http://vision.gyte.edu.tr/publications/2010/aydin10_focus.pdf>>, Optics Express,vol. 18, No. 13, Jun. 17, 2010, pp. 13.

Buades, et al., "Nonfocal Image and Movie Denoising", Retrieved at <<http://hal.archives-ouvertes.fr/docs/00/27/11/47/PDF/ijcvrevised.pdf>>, Author manuscript, published in International Journal of Computer Vision 76, 2, 2008, pp. 1-27.

Selesnick, et al., "Video Denoising using 2D and 3D Dual-Tree Complex Wavelet Transforms",Retrieved at << http://citeseerx.ist.psu.edu/viewdoc/download;jsessionid=DA0733E762AB833FCA1DAB91E9319218?doi=10.1.1.89.2750&rep=rep1&type=pdf>>,2003, pp. 12.

Zhang, et al., "Multiresolution Bilateral Filtering for Image Denoising",Retrieved at <<http://ieeexplore.ieee.org/stamp/stamp.jsp?arnumber=04664614>>, IEEE Transactio ns on Image Processing. vol. 17. No. 12. Dec. 2008,pp. 2324-2333.

Lucas, et al., "An Iterative Image Registration Technique with an Application to Stereo Vision",Retrieved at << http://ijcai.org/Past%20Proceedings/IJCAI-81-VOL-2/PDF/017.pdf>>,1981,pp. 674-679.

Acker et al., "Designing Videoconference Facilities for Improved Eye Contact," Journal of Broadcasting & Electronic Media, vol. 31, No. 2, Spring 1987, pp. 181-191, 12 pages.

Okada et al., "Multiparty Videoconferencing at Virtual Social Distance: MAJIC design," CSCW, pp. 385-393, 1994, 9 pages.

Simmel, G., "Sociology of the Senses: Visual Interaction," Introduction to the Science of Sociology, R. Park and E. Burgess, Editors, University of Chicago Press, 1921, pp. 356-361, 6 pages.

Zhang et al., "A Novel See-Through Screen Based on Weave Fabrics," ICME Multimedia & Expo, 2011 IEEE International Conference, Jul. 11-15, 2011, pp. 1-6, 6 pages.

* cited by examiner

IMAGING THROUGH A DISPLAY SCREEN

BACKGROUND

As globalization continues to spread throughout the world economy, it is increasingly common to find projects where team members are widely distributed across continents. Videoconferencing has long been considered a critical technology to reduce high travel expenses for distributed workforces. Nevertheless, even with high end teleconferencing solutions face-to-face meeting is usually still a better experience than remote meetings.

One of the factors that is known to be essential for face-to-face communication is eye contact. Eye contact can instill trust and foster an environment of collaboration and partnership. Lack of eye contact, on the other hand, may generate feelings of distrust and discomfort. Unfortunately, eye contact is usually not preserved in typical videoconferencing.

SUMMARY

The described implementations relate to enhancement images, such as in videoconferencing scenarios. One system includes a poriferous display screen having generally opposing front and back surfaces. This system also includes a camera positioned proximate to the back surface to capture an image through the poriferous display screen.

Another implementation can obtain an image captured by a camera through a display screen. Some light that strikes the display screen is transmitted through the display screen and contributes to the image and some other light that simultaneously strikes the display screen is reflected. This implementation can also process the image to accentuate an influence of the transmitted light and to reduce degradation of the image induced by the reflected light.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to enhancement of images (e.g., photos or video), especially enhancement of images captured through a display screen. The present implementations can be employed with any type of display screen that allows at least some light to pass therethrough. Examples of such display screens can include holographic screens, half-silver mirrors, and/or poriferous materials, among others. At a macro level a poriferous material can appear to be a solid material and can be employed as a very satisfactory display screen. However, at a micro level the poriferous material can include holes or pores interspersed among solid portions. One type of poriferous display screen is formed from a woven material. The "weave" introduces the pores in the material. The ability to enhance images captured through a poriferous material can enable a video conferencing system to be configured so that an eye-to-eye gaze can be captured and displayed to accomplish virtual eye contact.

System Examples

Figure 1:
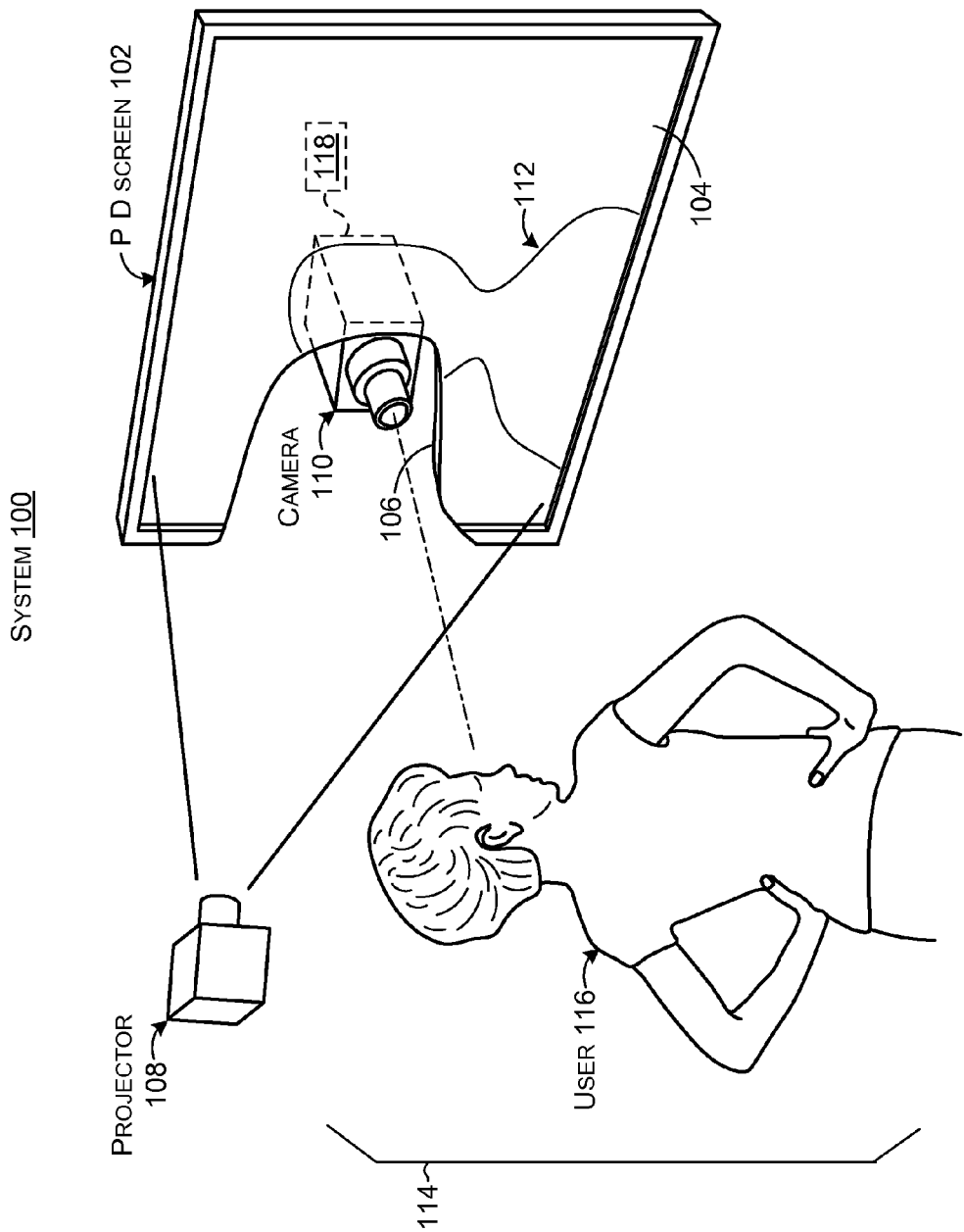
FIG. 1 is a perspective view of an example of an image enhancement system in accordance with some implementations of the present concepts.

FIG. 1 shows a system 100 in which the image enhancement concepts can be employed. In this case, system 100 includes a display screen manifest as a poriferous display screen 102 that has opposing front and back surfaces 104 and 106. The system also includes a projector 108 and a camera 110.

Projector 108 is positioned to project a first image 112 on the front surface 104 of the poriferous display screen 102. In one configuration, the projector 108 is positioned about 4-5 feet in front of the poriferous display screen. The projector can be in, or above, a viewing region 114. A user 116 located in viewing region 114 can view a first image 112 generated by the projector 108 and displayed on the front surface 104 of the poriferous display screen 102.

Camera 110 can be positioned behind the poriferous display screen 102 and proximate to the back surface 106 to capture a second image 118 of light passing through the poriferous display screen from the viewing region 114. Further, the camera can be positioned generally centrally (e.g., horizontally and vertically) on the poriferous display screen. In another configuration, the camera may be slightly vertically elevated from the center of the display screen. The position of the camera relative to the poriferous display screen may become more apparent in light of FIG. 2 and the related discussion. Briefly, in some implementations a potentially ideal camera position can be obtained by positioning the camera behind the eyes of an image of a person displayed on the poriferous display screen.

Figure 2:
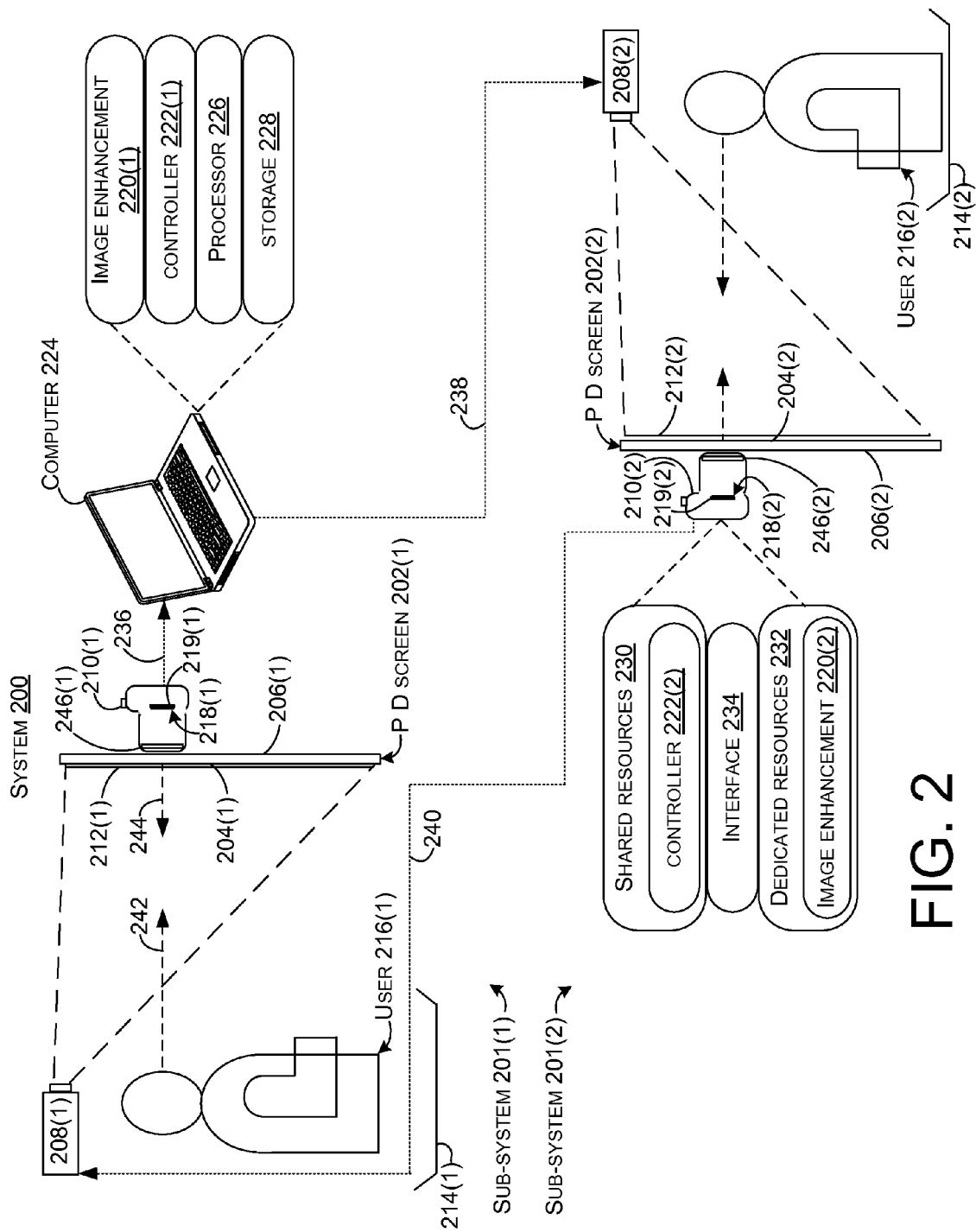
FIG. 2 shows another image enhancement system in accordance with some implementations of the present concepts.

FIG. 2 shows a system 200 that for ease of explanation is broken down into two sub-systems 201(1) and 201(2). In this case, sub-system 201(1) includes a poriferous display screen 202(1) that has opposing front and back surfaces 204(1) and 206(1), respectively. Similarly, sub-system 201(2) includes a poriferous display screen 202(2) that has opposing front and back surfaces 204(2) and 206(2), respectively. The sub-systems also include projector 208(1), 208(2) and cameras 210(1), 210(2), respectively.

Projector 208(1) is positioned to project a first enhanced image 212(1) on the front surface 204(1) of the poriferous display screen 202(1). A user 216(1) located in viewing region 214(1) can view the first enhanced image 212(1) on the front surface 204(1) of the poriferous display screen 202(1).

Camera 210(1) can be positioned behind the poriferous display screen 202(1) and proximate to the back surface 206 (1) to capture a second image 218(1) of light passing through the poriferous display screen from the viewing region 214(1). (For purposes of explanation, second image 218(1) is designated on a front surface of an image sensor 219(1) of camera 210(1)). The image sensor 219(1) can be any device configured to convert an optical image to an electrical signal. Examples of image sensors can include charge coupled devices (CCDs) and complementary metal oxide semiconductor (CMOS) types, among others.

Similarly, projector 208(2) is positioned to project a second enhanced image 212(2) on the front surface 204(2) of the poriferous display screen 202(2). A user 216(2) located in viewing region 214(2) can view the second enhanced image 212(2) on the front surface 204(2) of the poriferous display screen 202(2).

Camera 210(2) can be positioned behind the poriferous display screen 202(2) and proximate to the back surface 206 (2) to capture a first image 218(2) of light passing through the poriferous display screen from the viewing region 214(2).

Further, sub-system 201(1) can include an image enhancement component 220(1) and a controller 222(1). Similarly, sub-system 201(2) can include an image enhancement component 220(2) and a controller 222(2). In this case, image enhancement component 220(1) and controller 222(1) are manifest on a computer 224. Computer 224 can also include a processor 226 and storage 228.

The term "computer" or "computing device" as used herein can mean any type of device that has some amount of processing capability and/or storage capability. Processing capability can be provided by one or more processors that can execute data in the form of computer-readable instructions to provide a functionality. Data, such as computer-readable instructions, can be stored on storage. The storage can be internal and/or external to the computing device. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Examples of computers can include traditional computing devices, such as personal computers, cell phones, smart phones, personal digital assistants, cameras, video cameras, or any of a myriad of ever-evolving or yet to be developed types of computing devices. Further, while in this implementation, computer 224 contributes to the functionality of sub-system 201(1), in other implementations, this functionality could be provided in a cloud computing scenario. For instance, second image 218(1) could be sent to the cloud for enhancement. The resultant enhanced image 212(2) could be sent from the cloud to projector 208(2).

In the illustrated implementation of sub-system 201(2), image enhancement component 220(2) and controller 222(2) are manifest on camera 210(2). In some implementations, the camera could be configured in a similar manner to computer 224. However, in the illustrated implementation the camera can include a system on a chip (SOC) type design. In such a case, functionality provided by the camera can be integrated on a single SOC or multiple coupled SOCs. In this example, camera 210(2) includes shared resources 230 and dedicated resources 232. An interface(s) 234 facilitates communication between the shared resources and the dedicated resources. As the name implies, dedicated resources 232 can be thought of as including individual portions that are dedicated to achieving specific functionalities. For instance, in this example, the dedicated resources include image enhancement component 220(2).

Shared resources 230 can be storage, processing units, etc. that can be used by multiple functionalities. In this example, the shared resources include controller 222(2). While in this case, image enhancement component 220(2) is implemented as dedicated resources 232, in other configurations, this component can be implemented on the shared resources 230 and/or the controller 222(2) can be implemented on the dedicated resources 232.

In this implementation, second image 218(1) is sent to computer 224 as indicated by arrow 236. The computer's image enhancement component 220(1) processes the second image to produce the second enhanced image 212(2) that is sent to projector 208(2) as indicated by arrow 238. Projector 208(2) can display the second enhanced image 212(2) on poriferous display screen 202(2). Similarly, first image 218 (2) is processed by the image enhancement component 220 (2) of camera 210(2). This processing can produce the first enhanced image 212(1) that is sent to projector 208(1) as indicated by arrow 240. Projector 208(1) can display first enhanced image 212(1) on poriferous display screen 202(1). Specific enhancement techniques that can be employed by the image enhancement components 220(1) and 220(2) are described in detail below under the heading "imaging model example" and "video processing example".

In sub-systems 201(1) and 201(2) the cameras 210(1) and 210(2) are positioned behind their respective poriferous display screens 202(1) and 202(2). The selected location of the cameras can be explained through the following discussion relative to a video conferencing scenario between sub-system 201(1) and sub-system 202(2). Recall that first image 212(1) is of user 216(2) as captured by camera 210(2). When user 216(1) views the first image 212(1) on poriferous display screen 202(1), he/she tends to gaze at the other user's eyes in the first image. In this case, this gaze is represented by line 242. In this configuration, the positioning of the camera 210 (1) can be aligned with the user's gaze 242 as indicated by line 244 (e.g., user 216(1) is looking directly into camera 210(1)). Thus, when the second image 218(1) is communicated to and displayed on the other sub-system (as enhanced second image 212(2)), the other user 216(2) can feel as though he/she and the user 216(1) are making eye contact and vice-versa.

In sub-system 201(1), controller 222(1) can control the functioning of projector 208(1) and camera 210(1). In some implementations, the controller 222(1) can synchronize the operation of the projector 208(1) and camera 210(1). For instance, in one implementation, the controller 222(1) can use a V-sync signal of the projector input (e.g., enhanced first image 212(1)) to synchronize the projector 208(1) and the camera 210(1). Thus, for every other frame of first image 212(1), the projector 208(1) outputs a black image, allowing the camera 210(1) to open its shutter to capture an image (e.g., second image 218(1)). To summarize, from one perspective, the controller can be thought of as alternatively activating and de-activating the projector 208(1) and the camera 210(1).

To reduce flickering the controller can operate the projector 208(1) at a rate of at least 100 Hertz (Hz). For instance, in one case, projector 208(1) is capable of operating at 120 Hz. Operating at 120 Hz the projector is effectively refreshing the displayed image at 60 Hz. During the intervening 60 HZ the projector projects the black image and the camera 210(1)

captures second image 218(1). Thus, the projector can display 60 images per second and the camera can capture 60 images per second for a combined rate of 120 Hz. The DepthQ HD 3D™ projector is an example of a projector that can operate at 120 Hz and effectively refresh the displayed image at 60 Hz. The above mentioned projector can be used in sub-system 201(2). To summarize, controller 222(1) can synchronize operation of the camera 210(1) with projector 208(1) to perform time-multiplexing display and image (e.g., video) capture. Further, controller 222(2) can control the functioning of projector 208(2) and camera 210(2) in a similar manner.

Cameras 210(1) and 210(2) can be any camera or video camera capable of capturing images at a sufficient number of frames per second to avoid graininess. In the above example the cameras 210(1) and 210(2) can capture 60 frames per second during the intervals when the respective projectors 208(1) and 208(2) project black images. A non-limiting example of a suitable camera is a Flea3 FL3-FW-03S3C made by Point-Grey Research Inc™. This camera is capable of capturing 640×480 pixel images at 76 frames per second. Examples of two lenses 246(1) and 246(2) that can be used with the camera are the Fujinon® DF6HA-1B 6 mm f/1.2 lens and the Pentax® 12 mm f/1.2 lens. These lenses have relatively large apertures which can be useful with the small pores in the poriferous display screens 202(1) and 202(2).

In some implementations, poriferous display screens 202(1) and 202(2) can be manifest as a weave fabric. One weave fabric that can be utilized is CineWeave HD™ screen from SMX Cinema Solutions™, which has about 5% openness (e.g. porosity). Another weave fabric that can be utilized is SheerWeave™ solar shade made by Phifer™. A specific Phifer product is 2100 P02 white shade with 10% openness. Various implementations can utilize between about 1% to about 20% openness with about 80% to about 99% solid (e.g., reflective material). Also, in some implementations the back surface 206(1), 206(2) can be painted black and/or otherwise darkened to reduce backscatter. Other poriferous display screens can be created utilizing screen printing or other techniques. For instance, an array of generally highly reflective dots (e.g., white or metallic) can be screen printed and then an array of relatively absorbent dots (e.g., black) can be overprinted over the highly reflective dots. The highly reflective dots can be utilized as the front surface of the display screen and the relatively absorbent dots can be utilized as the back surface.

Figure 3:
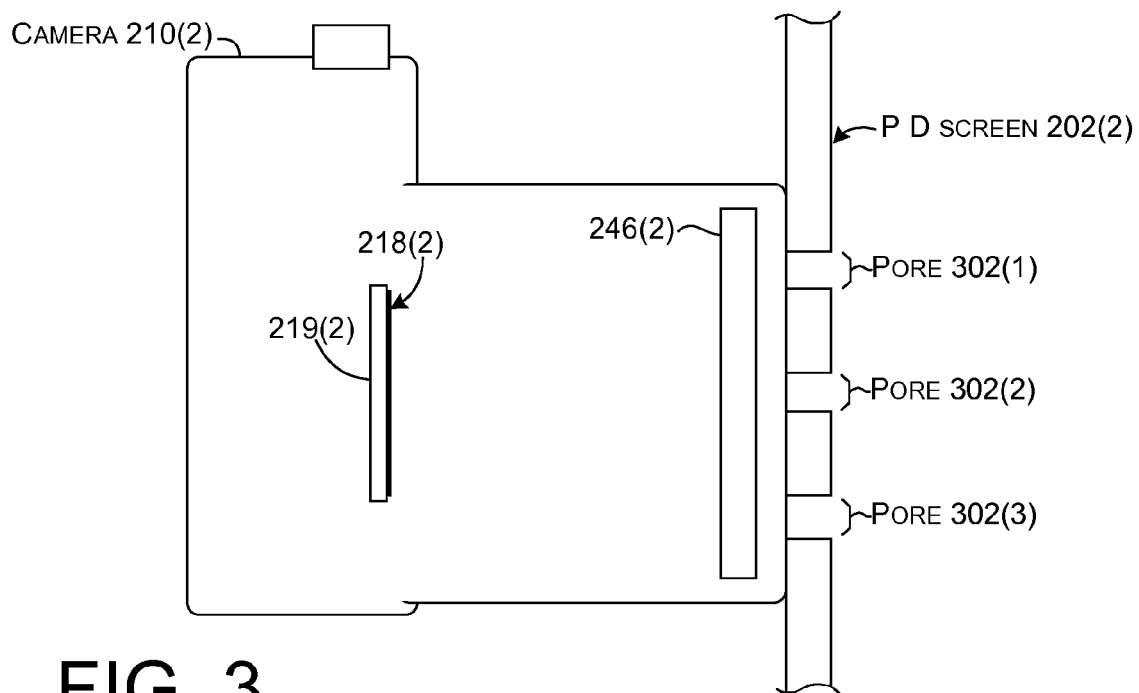
FIGS. 3 and 4 are sectional views of examples of cameras that can be employed as part of an image enhancement system in accordance with some implementations of the present concepts.
Figure 4:
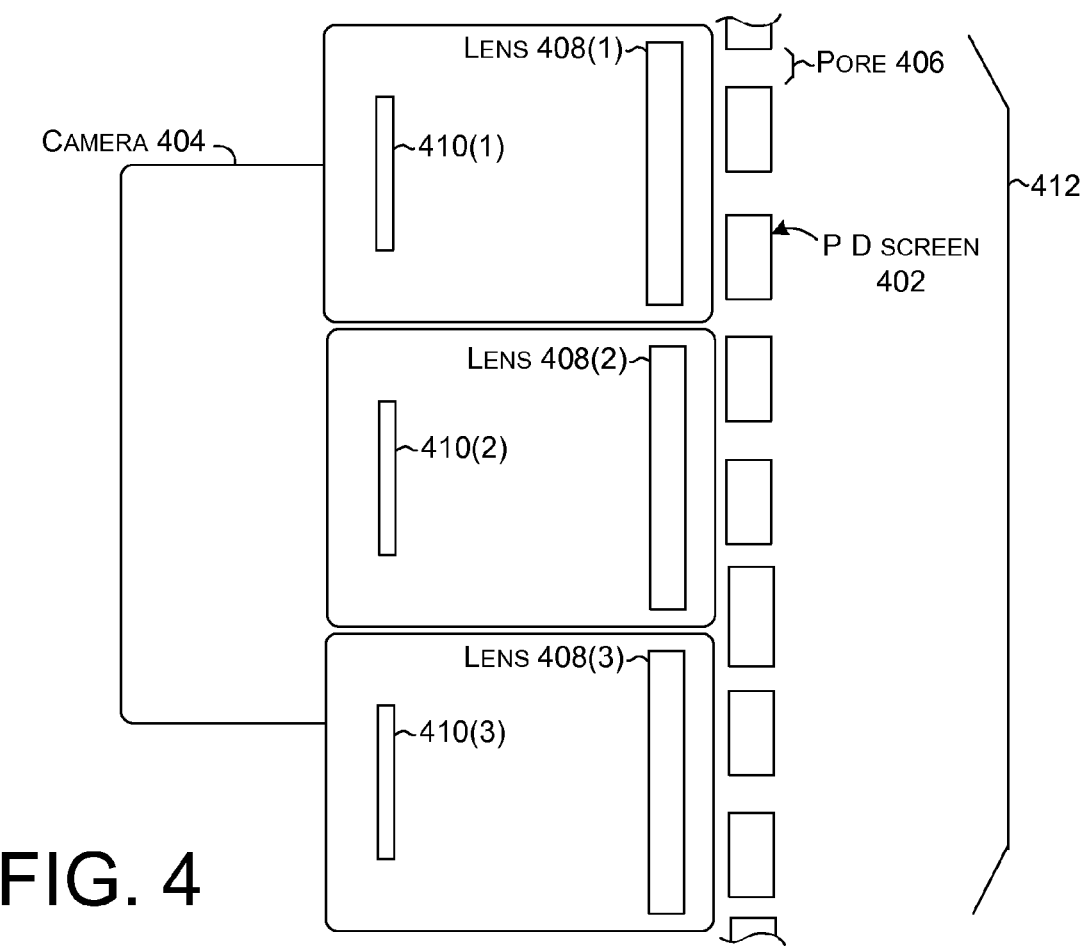

FIGS. 3-4 show more detailed views of two different camera and poriferous display screen configurations.

FIG. 3 shows a close-up view of camera 210(2) and poriferous display screen 202(2). In this case, camera 210(2) includes a single lens 246(2) that focuses on a single image sensor 219(2). Further, poriferous display screen 202(2) is generally solid except that pores or holes 302(1)-302(3) are formed in the poriferous display screen proximate to the camera lens 246(2). Other display screens that allow some degree of light transmission can be substituted for the illustrated poriferous display screen.

FIG. 4 shows an alternative configuration that includes a poriferous display screen 402 and a camera 404. In this case, the poriferous display screen is manifest as a mesh material or fabric that has pores 406 (not all of which are designated with specificity) interspersed generally throughout the material (or at least a majority of the material). In this implementation camera 404 includes multiple lenses. For purposes of explanation three lenses 408(1)-408(3) are illustrated, but other numbers of lenses may be employed. In this case, each lens 408(1)-408(3) is associated with a separate image sensor 410(1)-410(3) respectively. In other implementations, multiple lenses may focus upon a single image sensor. Further, the multiple lenses may be organized in various arrangements, such as a rosette or an array, among others. In some implementations, processing of images from the multiple lenses can create a virtual combined aperture 412. This aspect is discussed in more detail below.

Two of the potential benefits of utilizing multiple lenses and/or cameras with the present implementations are discussed below. First, multiple lenses and/or cameras can be employed behind the display screen to capture multiple images. These multiple images can be processed to create an enhanced image that is a higher quality representation of the scene in front of the display screen than might be obtained with a single camera/lens. Second, multiple cameras and/or lenses may be employed to capture the scene from multiple angles for gaze-correct multi-party video conferencing. In multi-party video conferencing, it can be desirable to send a separate video to each remote party, corresponding to the location on the display screen where the remote party is displayed.

Imaging Model Example

Figure 5:
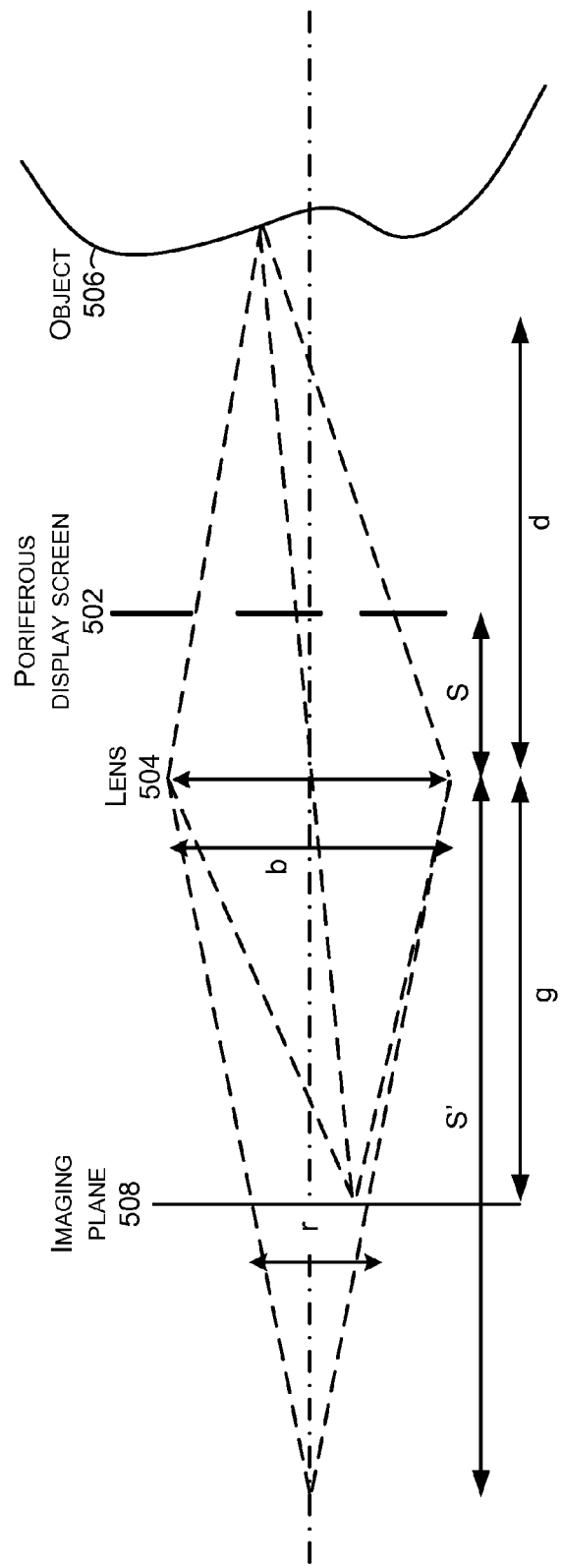
FIGS. 5 and 6 represent an example of an image enhancement model that can be employed in accordance with some implementations of the present concepts.

FIG. 5 shows a thin lens model 500 for reducing blurring caused by a poriferous display screen 502. Stated another way, the thin lens model can be applied to analyze a blurring diameter of a defocused poriferous display screen. In this case the focal length of the camera's lens 504 can be represented as "f". Assume the camera focuses on the object 506 at distance d with an imaging plane 508 at g. Accordingly, the thin lens equation can produce:

$$\frac{1}{d} + \frac{1}{g} = \frac{1}{f}. \quad (1)$$

If the poriferous display screen 502 is at distance s from the lens 504, the lens will be focused at s', where:

$$\frac{1}{s} + \frac{1}{s'} = \frac{1}{f}. \quad (2)$$

The blurring diameter r satisfies:

$$\frac{s' - g}{s'} = \frac{r}{b}, \quad (3)$$

where b is the aperture of the lens 504. Consequently, the model can obtain:

$$r = \frac{f^2(d-s)}{Ns(d-f)}, \quad (4)$$

where N=f/b is the f-number of the lens 504. It can be seen from Eq. (4) that increasing the focal length f, reducing the f-number N and decreasing the poriferous display screen distance s will all enlarge the blurring diameter r. To summarize, the above calculations can distinguish a difference between the imaging plane 508 and the actual focus point defined by s'.

The following discussion presents an enhanced model for the image formation process. Let the captured image be denoted as I(x), where x is the pixel index.

$$I(x) = [a(x)L(x) + (L_s * H_r)(x)]v(x) + \epsilon(x), \quad (5)$$

where L(x) is the object radiance observed by pixel x when there is no poriferous display screen occlusion. a(x) is the see-through ratio, which will be detailed later. $L_s$ is the radiance of the back side of the poriferous display screen, and $H_r$ is the blurring filter with diameter r, which is given by Eq. (4). Since, in at least some implementations, the back surface of the poriferous display screen is darkened or blackened, $L_s \approx 0$. Therefore, the term $(L_s * H_r)(x)$ can be safely ignored in some applications. v(x) is used to model scene independent effects such as vignetting, which happens often in low-cost lenses. $\epsilon(x)$ is the sensor noise.

Figure 6:
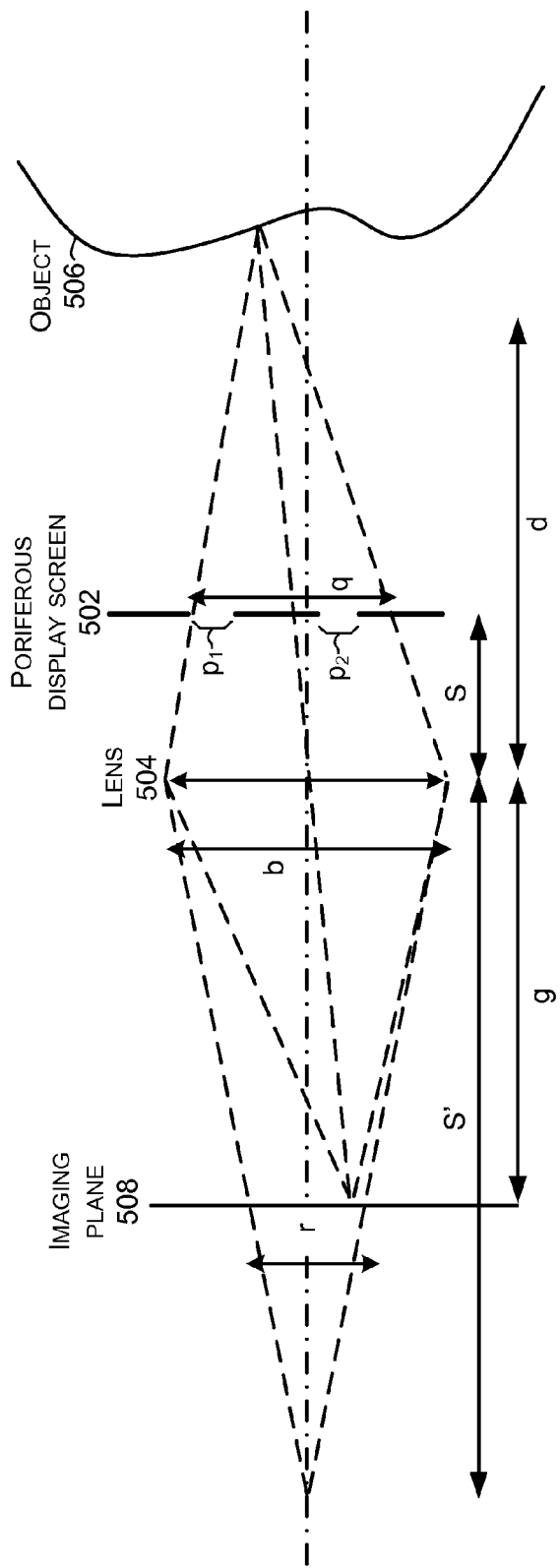

FIG. 6 illustrates the computation of the see-through ratio a(x) relative to model 500. Generally, the object surface can only be seen through the holes or pores $p_i$, i=1, 2, . . . , which can be represented as:

$$a(x) = \frac{\Sigma_i A_{p_i}}{A_q}, \quad (6)$$

where $A_p$ is the opening area of hole i, and $A_q$ is the overall area of lights at the screen distance s that enter the lens 504 and reach x when there is no occlusion.

Let $A_b$ denote the area of the aperture, since $$\frac{A_q}{A_b} = \frac{(d-s)^2}{d^2}, \quad (7)$$

if the object is at a constant depth, $A_q$ will be a constant proportional to the aperture area $A_b$. However, since the holes of the poriferous display screen have finite sizes, different holes will be seen when varying x. Hence a(x) varies depending on x. For a piece of poriferous display screen with average openness $a_0$, $$a(x) \to a_0 \text{ if } \max_i \frac{A_{p_i}}{A_q} \to 0. \quad (8)$$

In other words, to reduce the fluctuation of the see-through ratio, the model can either increase the lens aperture, or reduce the size of the holes in the poriferous display screen 502. Further details regarding techniques to correct the unevenness of the see-through ratio digitally are described below under the heading "Recovering the object radiance".

For a real-world lens, the see-through ratio may be affected by other factors, such as lens distortions, edge effects, etc. Different poriferous display screens 502 also have unevenness in the size and distribution of holes. Accordingly, as a general rule, for lenses of comparable quality, lenses with larger apertures tend to be less affected by the unevenness.

Video Processing Example

Captured images are often dark and noisy due to various contributing factors. For instance, one factor can be the relatively small percentage of openness of the poriferous display screen. Another factor can be the relatively short camera exposure time associated with a 100 plus Hz operating rate, such as around 7 milliseconds per frame. This section describes a two-step video enhancement process to improve the video quality: first, recovering the object radiance; and second, video de-noising.

Recovering the Object Radiance

The above description provides an imaging model for the camera capturing an image through the poriferous display screen. Although the see-through ratio a(x) can be hard to predict, the object radiance can be recovered as follows.

First, a video of a static, pure white object (e.g., a blank white paper) can be captured for comparison. According to Eq. (5), the received images can be represented as:

$$I(x) = a(x)v(x)L_0 + \epsilon(x), \quad (9)$$

where $L_0$ is the constant radiance of the white object. Note the term $(L_s * H_r)(x)$ in Eq. (5) has been ignored since $L_s \approx 0$.

By averaging these video frames to obtain a mean image $\overline{I_0}(x)$, the technique can effectively diminish or remove the sensor noises, obtaining:

$$\overline{I_0}(x) = a(x)v(x)L_0. \quad (10)$$

That is, the mean image $\overline{I_0}(x)$ captures the fluctuation of a(x) and scene independent effects v(x). An arbitrary scene captured by the same camera, can be expressed as:

$$I(x) = a(x)v(x)L(x) + \epsilon(x). \quad (11)$$

Combining Eq. (10) and (11), produces:

$$L(x) \approx \frac{I(x)L_0}{\overline{I_0}(x)}, \text{ when } \overline{I_0}(x) \gg \epsilon(x), \quad (12)$$

which can be efficiently computed for each frame. The condition $\overline{I_0}(x) \gg \epsilon(x)$, is usually satisfied if a large aperture lens is placed right behind the poriferous display screen and focused on objects a few feet away from the poriferous display screen.

It is worth mentioning that if the aperture of the lens is very large or the poriferous display screen holes are very small (assume the same openness), a(x) will be near constant, and the raw image captured by the camera will be a very good approximation of the radiance after typical scene independent processes such as vignetting removal.

Video De-Noising

Recall that the images captured by the camera tend to be very noisy due to the poriferous display screen. These noises remain in the processed images after radiance recovery. Therefore some implementations can employ video de-noising to further improve the video quality.

Traditional video de-noising approaches tend to use algorithms that are very computationally expensive. Recall that some of the present implementations capture video at about 50 frames per second or higher to avoid user-perceived image blinking. In order to perform real-time video de-noising, some of these implementations can employ temporal de-noising. The optical flow of neighboring frames is first estimated, such as by using a Lucas-Kanade method. Corresponding pixels based on the optical flow can then be averaged to obtain the de-noised image. The algorithm can be implemented with multiple threads, each handling a sub-region of the input video frame. Other solutions can include graphical processing unit (GPU)-based implementations to further speed up the de-noising process.

Figure 7:
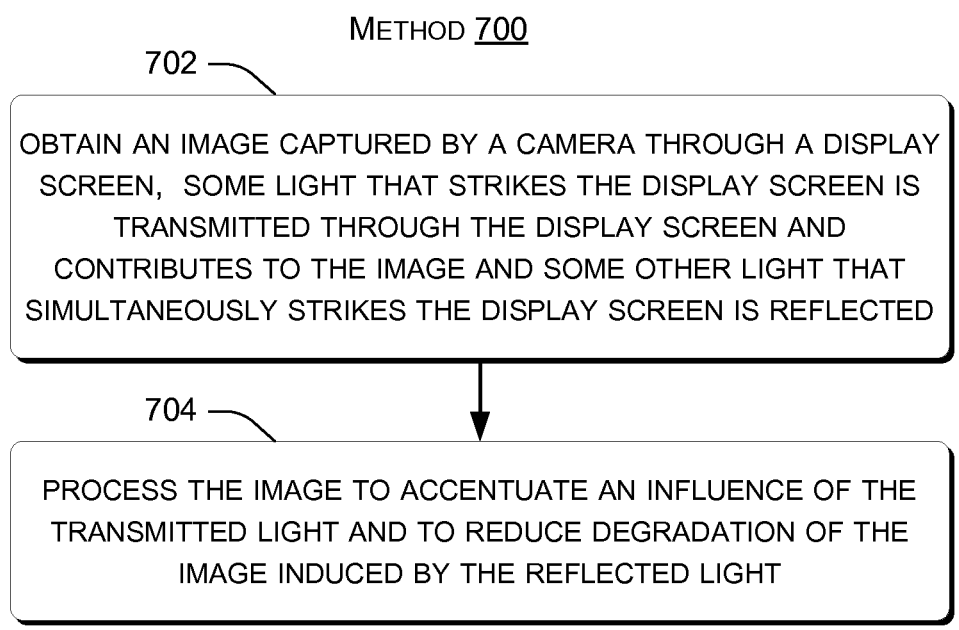
FIG. 7 is a flowchart of an exemplary image enhancement technique in accordance with some implementations of the present concepts.

To summarize, several examples are describe above for processing an image captured through a poriferous material. The poriferous material tends to degrade the image, such as by introducing artifacts in the image. The processing can serve to enhance the image to produce a higher quality (e.g., enhanced) image. FIG. 7 describes a general method related to employing enhancement techniques to images captured through a display screen.

Further Examples

FIG. 7 illustrates a flowchart of a technique or method 700 that is consistent with at least some implementations of the present concepts.

At block 702, the method can obtain an image captured by a camera through a display screen. The display screen can allow some light that strikes the display screen to be transmitted through the display screen. This transmitted light can contribute to the image and some other light that simultaneously strikes the display screen is reflected. Examples of display screens are described above. Briefly, the display screen can be a poriferous material, a holographic screen, or a half-silver mirror, among others.

At block 704, the method can process the image to accentuate an influence of the transmitted light and to reduce degradation of the image induced by the reflected light. For instance, in the case of a poriferous material, the processing can accentuate an influence of light that passes through pores of the poriferous material and reduce degradation of the image induced by solid portions of the poriferous material. Viewed from one perspective, this processing can be thought of as enhancement of the image. In some implementations, block 704 can be performed by the camera. In other implementations, the image can be sent to another device for processing. In teleconferencing implementations, the enhanced image can be sent for presentation to a remote user.

The order in which the method 700 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

CONCLUSION

Although techniques, methods, devices, systems, etc., pertaining to image enhancement scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
   a poriferous display screen having generally opposing front and back surfaces;
   a projector positioned generally in front of the poriferous display screen and configured to project a first image on the front surface of the poriferous display screen;
   a camera positioned behind the poriferous display screen and proximate to the back surface to capture a second image through the poriferous display screen;
   a controller configured to alternatively activate and deactivate the projector and the camera at a combined rate of at least one hundred Hertz; and,
   an image enhancement component configured to reduce artifacts in the second image caused by the poriferous display screen.

2. The system of claim 1, wherein the projector is positioned above an intended viewing area from which a user can see the first image on the front surface.

3. The system of claim 1, wherein the poriferous display screen comprises a mesh or a solid material having holes formed therein between the front and back surfaces or wherein the poriferous display screen comprises a black matrix having white dots screen printed thereon.

4. The system of claim 3, wherein the holes occur only proximate the camera or the holes are formed throughout a majority of the poriferous display screen.

5. The system of claim 1, wherein the poriferous display screen comprises about 90% to about 95% reflective material and about 5% to 10% holes.

6. The system of claim 1, wherein the camera includes multiple lenses and wherein the multiple lenses are positioned against the back surface.

7. The system of claim 1, wherein the camera is a video camera.

8. A system, comprising:
   a poriferous display screen having generally opposing front and back surfaces, the poriferous display screen consisting of a solid material with multiple pores formed therein;
   a projector positioned generally in front of the poriferous display screen and configured to project a first image on the front surface of the poriferous display screen such that the first image is visible on the solid material;
   a camera positioned behind the poriferous display screen and proximate to the back surface to capture a second image through at least two of the multiple pores in the solid material;
   a controller configured to alternatively activate and deactivate the projector and the camera at a combined rate of at least one hundred Hertz; and,
   an image enhancement component configured to reduce artifacts in the second image caused by the solid material of the poriferous display screen.

9. The system of claim 8, wherein the multiple pores are formed throughout a majority of the poriferous display screen.

10. The system of claim 8, wherein about 90% to about 95% of an area of the poriferous display screen comprises the solid material and about 5% to 10% of the area comprises the multiple pores.

11. The system of claim 10, wherein the artifacts in the second image are noise artifacts caused by the solid material of the poriferous display screen.

12. The system of claim 8, wherein the poriferous display screen is defocused in the second image, and wherein the image enhancement component is configured to analyze a blurring diameter of the defocused poriferous display screen.

13. The system of claim 8, wherein the artifacts in the second image are noise artifacts caused by the poriferous display screen, and the image enhancement component is configured to reduce the noise artifacts by video de-noising.

14. The system of claim 13, wherein the video de-noising includes temporal de-noising.

* * * * *